Patented Apr. 21, 1925.

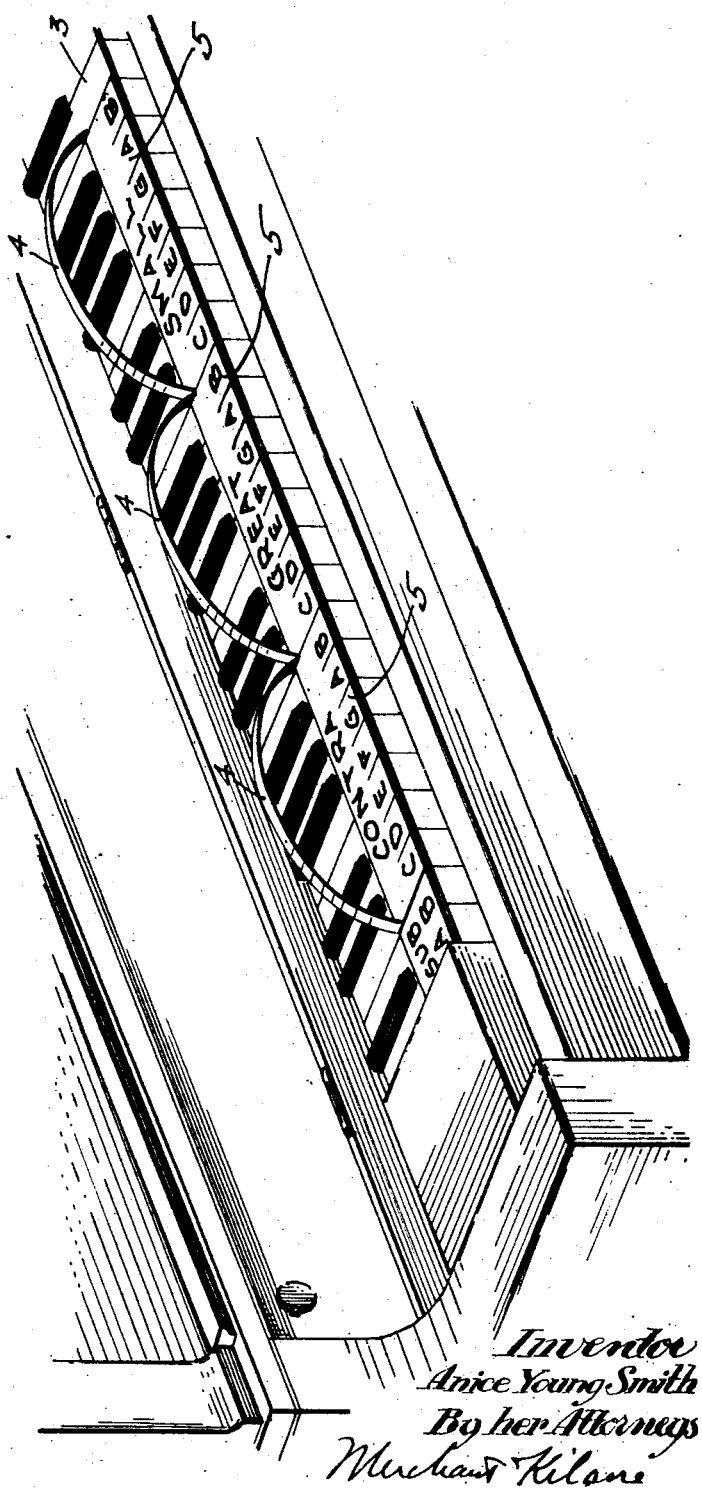

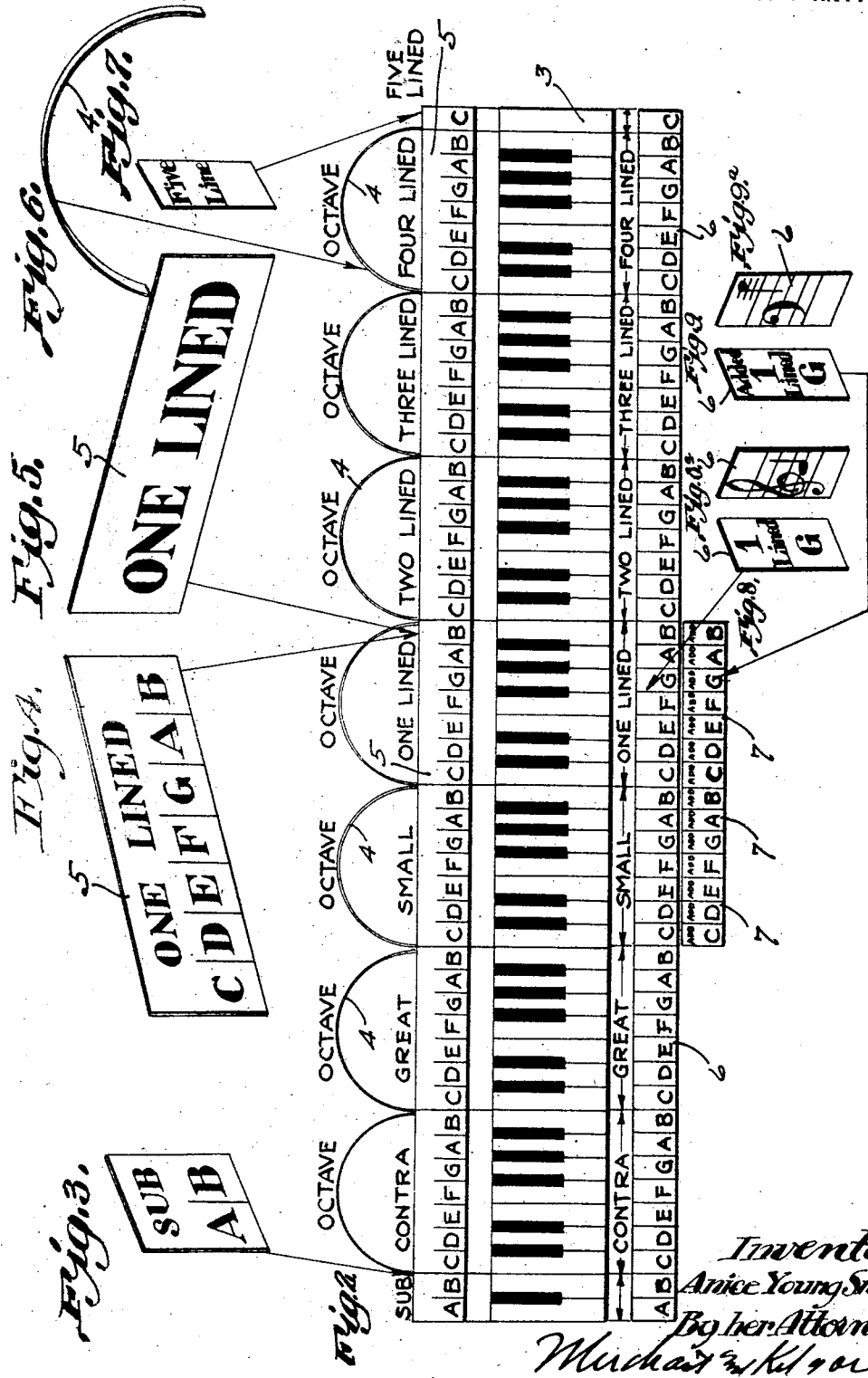

1,534,669

UNITED STATES PATENT OFFICE.

ANICE YOUNG SMITH, OF MINNEAPOLIS, MINNESOTA.

PIANO-KEYBOARD CARD SYSTEM.

Application filed September 11, 1922. Serial No. 587,290.

*To all whom it may concern:*

Be it known that I, ANICE YOUNG SMITH, a citizen of the United States, residing at Minneapolis, in the county of Hennepin and State of Minnesota, have invented certain new and useful Improvements in Piano-Keyboard Card Systems; and I do hereby declare the following to be a full, clear, and exact description of the invention, such as will enable others skilled in the art to which it appertains to make and use the same.

My invention has for its object to provide a simple and efficient means for facilitating the instruction of beginners in the nature and arrangement of the keyboard of a piano, and the invention comprises what I have styled a "piano keyboard card system."

The modern piano keyboard is usually divided into seven complete octaves, distinguished as contra, great, small, one-lined, two-lined, three-lined and four-lined octaves, and there are usually one or two lower and higher notes at the extremities of the keyboard. Within each octave there are seven keys designated as *c, d, e, f, g, a* and *b*, and, of course, each key represents a note in the scale. The C major scale is used in this instruction.

The so-called "card system" comprises several different kinds of main elements, to wit: octave markers, in the form of resilient strips, octave name cards marked to designate the keys *c, d, e, f, g, a, b*, and individual note cards, of which latter there should be one for each white key of the piano keyboard.

The invention is illustrated in the accompanying drawings, wherein like characters indicate like parts throughout the several views.

Referring to the drawings:

Fig. 1 is a perspective showing certain parts of the card system applied to the keyboard of a piano; and Fig. 2 is a diagrammatic view showing the keyboard of the piano; and Figs. 3, 4, 5, 6, 7, 8, 8ª, 9 and 9ª are diagrammatic views showing certain of the elements of my card system associated with the keyboard of the piano, some of the parts assembled and some of the same said parts removed from position and illustrated in perspective, the corresponding elements being designated by long arrows.

The white keys of the keyboard of the piano are indicated by the numeral 3. For the purposes of this case, the black keys may be ignored.

Of the parts of my card system, the octave markers are indicated by the numeral 4, the octave name cards by the numeral 5 and the individual note cards by the numerals 6 and 7. All of these elements may be made of card board, celluloid or of any other suitable material. The octave markers 4 are normally straight narrow strips capable of being sprung into bowed form and inserted between the white keys of the keyboard so as to mark off octaves, as indicated in perspective in Fig. 1 and as diagrammatically indicated in Fig. 2. The octave name cards 5 are the length of an octave, that is, are co-extensive with seven of the white keys 3. On one side, they are marked with the designation of the particular octave and with the key spaces *c, d, e, f, g, a* and *b*, as indicated in Fig. 2, and on the other side they are preferably marked simply with the name of the particular octave. Note that in Fig. 2 the octave name card illustrated above is marked on the one face with the words "One-lined" and the key letters *c, d, e, f, g, a* and *b*, and on the opposite face simply with the words "One-lined."

The individual note cards 6 are each the width of one key 3 and they are marked on one face with the particular individual key letter and on the other face with the particular individual scale note. This same is true in respect to the supplemental cards 7, but the latter preferably have the additional marking of "Add," indication "additional."

The use of the card system in giving instructions to pupils may be illustrated as follows:

1. Place the octave markers 4 on the keyboard, as indicated in perspective in Fig. 1 and as diagrammatically indicated in Fig. 2.

2. Place the octave name cards 5 on the keys under the proper octave markers 4.

3. Turn the octave name cards 5 with their letters *c, d, e, f, g, a* and *b* upward and over the corresponding keys of the octaves.

4. Place each individual card 6 on the proper key and the proper octave, first with the scale letters exposed to view, and then turn the same over to expose the scale note designations. Also the additional cards 7 may be properly located in respect to the keys.

This will give the pupil the quick understanding of the relation of the keys of the piano to the staff scale and to the key letter scale. After the pupil has been given an initial instruction, he should be called upon to properly place the various cards or markers on the keyboard. Doing this may be turned into a sort of game; the cards or elements may be shuffled up and the pupil called upon to properly sort out and place the same on the keyboard. Also, the instructor may take any piece of music and have the pupil pick out the proper individual note cards and place the same on the keyboard to indicate the notes thereof.

In actual practice, I have found this card system to be a very great assistance in giving instructions to beginners in the study of the piano.

What I claim is:

1. A keyboard card system for use in teaching the arrangement of the keys of a piano, comprising octave markers capable of being bent and of a length to have their ends inserted between keys to divide the keyboard into octaves; octave name cards having octave designations and key letter designations marked thereon, said cards being of a length to cover keys representing an octave and the key letter designations thereof being spaced to correspond to the key spaces of the octave; and individual key cards corresponding to individual keys and having key letters and staff notes marked thereon.

2. The structure defined in claim 1 in which the key letter and staff note designations are on opposite sides of said individual note cards.

In testimony whereof I affix my signature.

ANICE YOUNG SMITH.